United States Patent [19]

Orman

[11] Patent Number: 5,767,960
[45] Date of Patent: Jun. 16, 1998

[54] OPTICAL 6D MEASUREMENT SYSTEM WITH THREE FAN-SHAPED BEAMS ROTATING AROUND ONE AXIS

[75] Inventor: Maciej Orman, Woj. Jelenia Gora, Poland

[73] Assignee: Ascension Technology Corporation, Burlington, Vt.

[21] Appl. No.: 663,987

[22] Filed: Jun. 14, 1996

[51] Int. Cl.[6] ........................................... G01B 11/26
[52] U.S. Cl. .......................... 356/139.03; 356/141.3
[58] Field of Search .......................... 356/139.03, 141.3

[56] References Cited

U.S. PATENT DOCUMENTS

| | | | |
|---|---|---|---|
| 3,375,375 | 3/1968 | Abbey et al. | 356/139.03 |
| 4,911,548 | 3/1990 | Keren-Gill | 356/1 |
| 5,090,803 | 2/1992 | Ames et al. | 356/152 |
| 5,100,229 | 3/1992 | Lundberg et al. | 356/1 |
| 5,187,540 | 2/1993 | Morrison | 356/152 |
| 5,546,176 | 8/1996 | Jokinen | 356/5.1 |
| 5,552,883 | 9/1996 | Busch-Vishniac et al. | 356/139.03 |

*Primary Examiner*—Mark Hellner
*Attorney, Agent, or Firm*—H. Jay Spiegel

[57] ABSTRACT

A system for the determination of the distance and orientation of an object carrying at least three light sensors from a fixed reference point when the object is irradiated by at least three modulated scanning beams of known angular orientation, and rotational frequency. Timing circuitry located in the control processor determines the time interval $\Delta t$, between successive interceptions of the object by each of the beams. Knowledge of this time interval and the scanning beams' relative positions and angular orientations permits calculation of the object's spatial coordinates. The optical beams utilized are fan-shaped in cross-section. The method of operation is also disclosed.

21 Claims, 12 Drawing Sheets

OPTICAL 6D MEASUREMENT SYSTEM WITH THREE FAN-SHAPED BEAMS ROTATING AROUND ONE AXIS

BACKGROUND OF THE INVENTION

This invention relates to the determination of the six spatial parameters position (x, y, z) and orientation ($\psi$, $\theta$, $\phi$) of an object relative to a fixed reference point. The invention has applications in the fields of medicine, robotics, fire control systems, remote control applications, and virtual reality systems.

In particular, the device is designed for measuring position and orientation in six degrees of freedom, namely motion or translation in three coordinate directions (location), and rotational motion about three coordinate axes (orientation), location being commonly defined as a set of x, y, and z linear coordinates referring to three mutually perpendicular directions (axes) and orientation being commonly defined as pitch, roll and azimuth angular coordinates about three mutually perpendicular axes usually coincident with three mutually perpendicular directions.

Prior art spatial position and orientation measurement equipment rely on either optical or electromagnetic techniques to determine spatial coordinates. The optical schemes often rely on a complex scheme of multiple scanners, in conjunction with reflectors and photosensors to function properly.

Several U.S. Patents disclose subject matter of general background interest to the present invention:

1) U.S. Pat. No. 3,375,375 to Abbey et al. discloses the use of two rotating scanners generating optical fan shaped beams as well as sensors attached to the object to be measured, specifically a pilot's helmet. This two scanner system is necessary merely to compute the line-of-sight (LOS) to the pilot's helmet, and offers no method to determine the position or orientation of the pilot's helmet.

2) U.S. Pat. No. 4,818,107 to Ono et al. discloses a system for measuring the position of a moving body. The system utilizes two fixed scanning laser beams with separate origins and three photodetectors on the moving body. The system uses triangulation and measures only the position (x,y,z) and the attitude angle but fails to measure both the position and orientation in six dimensions.

3) U.S. Pat. No. 4,896,962 to Menn et al. discloses a system for determining the spatial location and the line-of-sight of a person wearing a helmet. The system utilizes at least four LEDs placed on the helmet and a fixed two-dimensional array of photoelectric elements. A spherical lens is placed in front of the detector in order to focus the light from the LEDs onto the detector. The work area of this system is limited to the coverage of the lens. In contrast, the present invention has a 360 degree work area due to the rotation of the beams. The present invention utilizes rotary fan-shaped light beams and movable photo detectors. The present invention utilizes time measurements and overcomes problems with ambient light sources and positional errors with CCDs in order to achieve higher accuracies.

4) U.S. Pat. No. 4,911,548 to Keren-Gill discloses a system that employs multiple scanners for the origination of multiple fan-shaped optical beams. The scanning mechanism is extremely complicated and cumbersome, and requires precise synchronization between the scanners in order to maintain measurement accuracy. The Keren-Gill system does not measure the six position and orientation coordinates measured by the present invention.

5) U.S. Pat. No. 5,128,794 to Mocker et al. discloses a system for measuring the helmet mounted sight of a pilot. The system utilizes at least two laser scanning units with different origin. The system utilizes at least two motors and further utilizes passive reflective markers on the pilot. Mocker et al. only measure the pilot's line-of-sight and do not measure both the position and orientation in six dimensions.

6) U.S. Pat. 5,208,641 to Mocker et al. discloses a system for also measuring the helmet mounted sight of a pilot. The system utilizes a laser cavity and at least three laser detectors. The system further utilizes passive reflective markers on the pilot but only measures the pilot's line-of-sight and not the position and orientation in six dimensions.

Prior optical systems are also subject to interference from extraneous sources such as ambient light or electrical sources and, as such, are prone to error, or, at minimum, severe limitations in system flexibility and ease of operation.

Prior art optical positioning systems clearly demonstrate the need for a more compact measuring system that offers greater accuracy. The need for such a system was the impetus for the development of the invention described herein.

SUMMARY OF THE INVENTION

Accordingly, it is an object of the present invention to provide a unique and enhanced optical 6D measurement system with three fan-shaped beams rotating around one axis.

According to a broad aspect of this invention, there is provided a technique of determining the spatial coordinates of an object consisting of the following aspects:

1) Generation of at least three modulated optical radiation beams; the rotational displacement of these beams with respect to the object being defined in a manner that knowledge of the time and placement of beam intersection with the object will permit calculation of the object's spatial coordinates.

The invention is based on the simple premise that if the angular velocity, of the optical beams is known, then the angle, that is swept in a time interval t is calculated by the relationship given in Equation 1.

$$\alpha = \omega \Delta t \qquad \text{Equation 1}$$

2) Utilization of at least three rotating fan-shaped beams, with established spacing and angular orientation, facilitates the resolution of the three spatial coordinates of an object with respect to a fixed reference point by reducing the problem to the use of triangulation to determine the coordinates (x,y,z).

The present invention includes a technique for the determination of the distance and orientation of an object from a fixed reference point when the object is irradiated by three modulated scanning beams of known angular orientation, and rotational frequency, $\omega$. Timing circuitry located in the control processor determines the time interval $\Delta t$, between successive interceptions of the object by each of the three beams. Knowledge of this time interval and the scanning beams' relative positions and angular orientations permits calculation of the object's spatial coordinates.

3) The optical beams utilized in this invention are fan-shaped in cross-section. Use of the fan-shaped beams, rather than narrowly focused beams, facilitates angular measurements made outside the plane of the transmitter.

4) As one would anticipate, the measurement accuracy of the device is a direct function of the stability of the scanning transmitter and the accuracy that the timing intervals can be measured. This invention employs techniques to ensure transmitter scanning stability, as well as unique timing measurement techniques to achieve accurate spatial coordinate measurements.

5) The system employs a receiver located at the object whose position is to be measured relative to the scanning transmitter. The receiver makes use of optically sensitive devices which respond to the radiation spectrum of the transmitted beams. The optical devices generate a voltage signal proportional to the incident optical energy, which is amplified and manipulated by the control processor to accurately determine the precise time that an optical beam impinged on a particular sensor. Knowledge of the precise time interval is then used to calculate the angle through the fundamental relationship as given in Equation 1.

6) The scanning transmitter generates three modulated optical beams, two of which are parallel and separated from each other by a known distance, while the third beam is skewed at an angle of relative to the other two beams. Spatial and hence temporal synchronism between the beams is inherent in the scanning transmitter mechanism due to the fact that all three beams are generated simultaneously by a single scan generator, with a common point of origin. Use of a single transmitter obviates potential problems inherent with other proposed inventions that rely on an individual scanner for the generation of each beam, and, as such, have stringent system requirements on the positional stability, frequency and phase synchronization between the scanners.

Accordingly, it is a first object of the present invention to provide an optical 6D measurement system with three fan-shaped beams rotating around one axis.

It is a further object of the present invention to provide such a system employing a scanning transmitter that emits three beams of light.

It is a still further object of the present invention to provide such a system wherein three beams of light are emitted with two of the beams lying in parallel planes and with a third beam skewed with respect thereto.

It is a yet further object of the present invention to provide such a system including a receiver having six sensors in a prescribed non-coplanar pattern.

These and other objects, aspects and features of the present invention will be better understood from the following detailed description of the preferred embodiments when read in conjunction with the appended drawing figures.

SPECIFIC DESCRIPTION OF THE PREFERRED EMBODIMENTS

Figure 1:
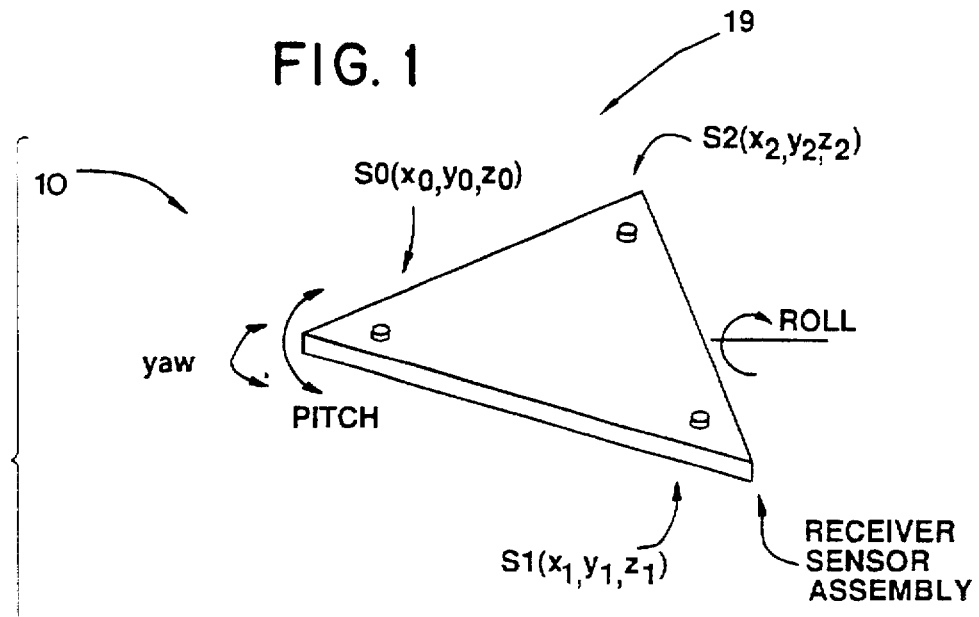
FIG. 1 shows a schematic representation of a first embodiment of the present invention wherein the receiver sensor assembly is scanned by the scanning transmitter with coordinate system and pitch, roll and yaw definitions for the sensor plane defined.
Figure 1:
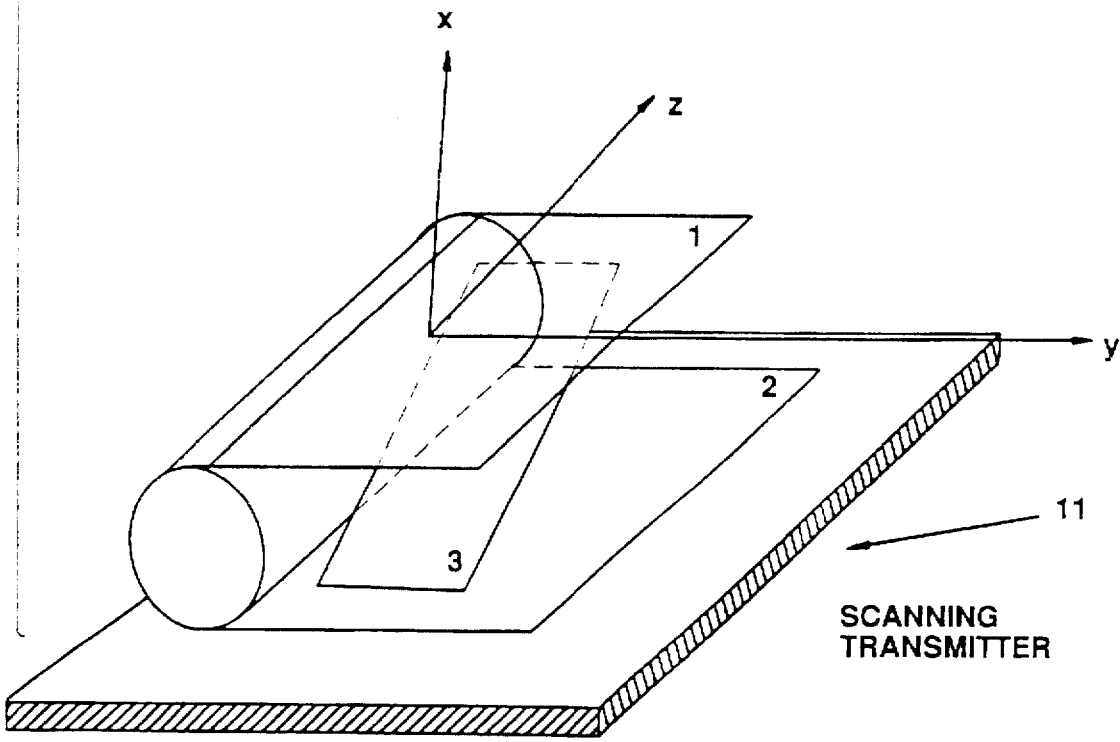

Referring to FIG. 1, the inventive system is generally designated by the reference numeral 10 and the geometry of the optical system is depicted. The transmitter means or scanning transmitter 11 emits three fan-shaped beams 1, 2 and 3. Beam 1 and beam 2 lie in parallel planes tangent to rotating cylinder 13. Beam 3 is skewed in relation to beam 1 and beam 2 at the angle β but is also placed on the rotating cylinder. The receiver or receiver assembly 19 consists of at least three sensors S1, S2 and S3 arranged in a triangular pattern as shown. The system 10 measures the position of each of the sensors and then calculates the receiver assembly position and orientation.

Figure 2:
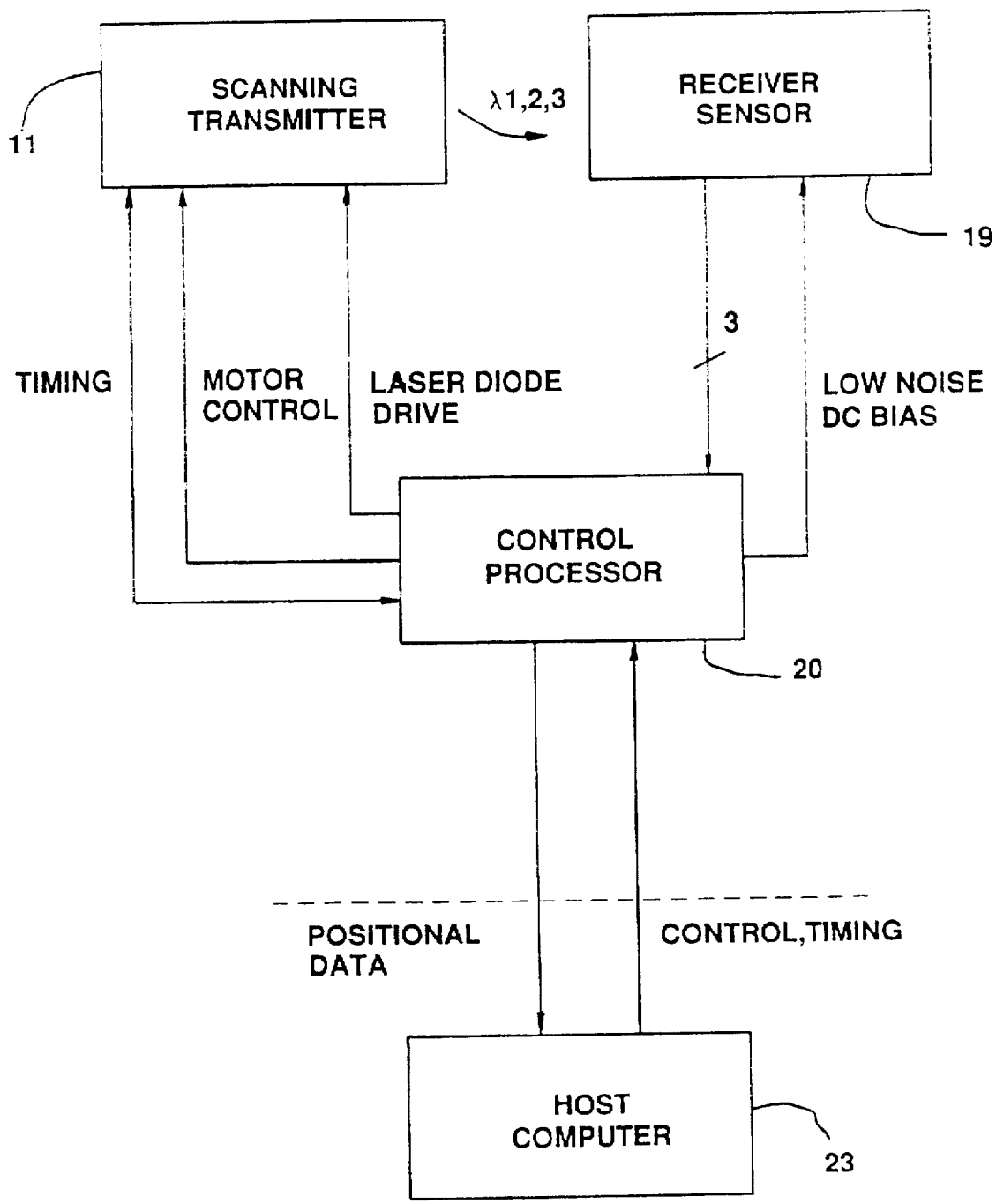
FIG. 2 shows a block diagram of the three axis optical measurement system of FIG. 1, showing all major component parts.

FIG. 2 shows, schematically, a block diagram of the three axis measurement system that is the basis of this invention. The principal component parts of the system are the scanning transmitter 11, the receiver sensor assembly 19, and the computer means or control processor 20. The processor 20 supplies synchronization timing, laser diode modulation, and DC voltages to the scanning transmitter 11. The control processor 20 also generates a low noise DC bias voltage that powers the receiver sensor assembly 19, and receives, via the connection means shown, the three optical sensor outputs generated by the receiver 19. Finally, the control processor 20 performs all signal processing and coordinate determination to the host computer or microprocessor 23.

Figure 3:
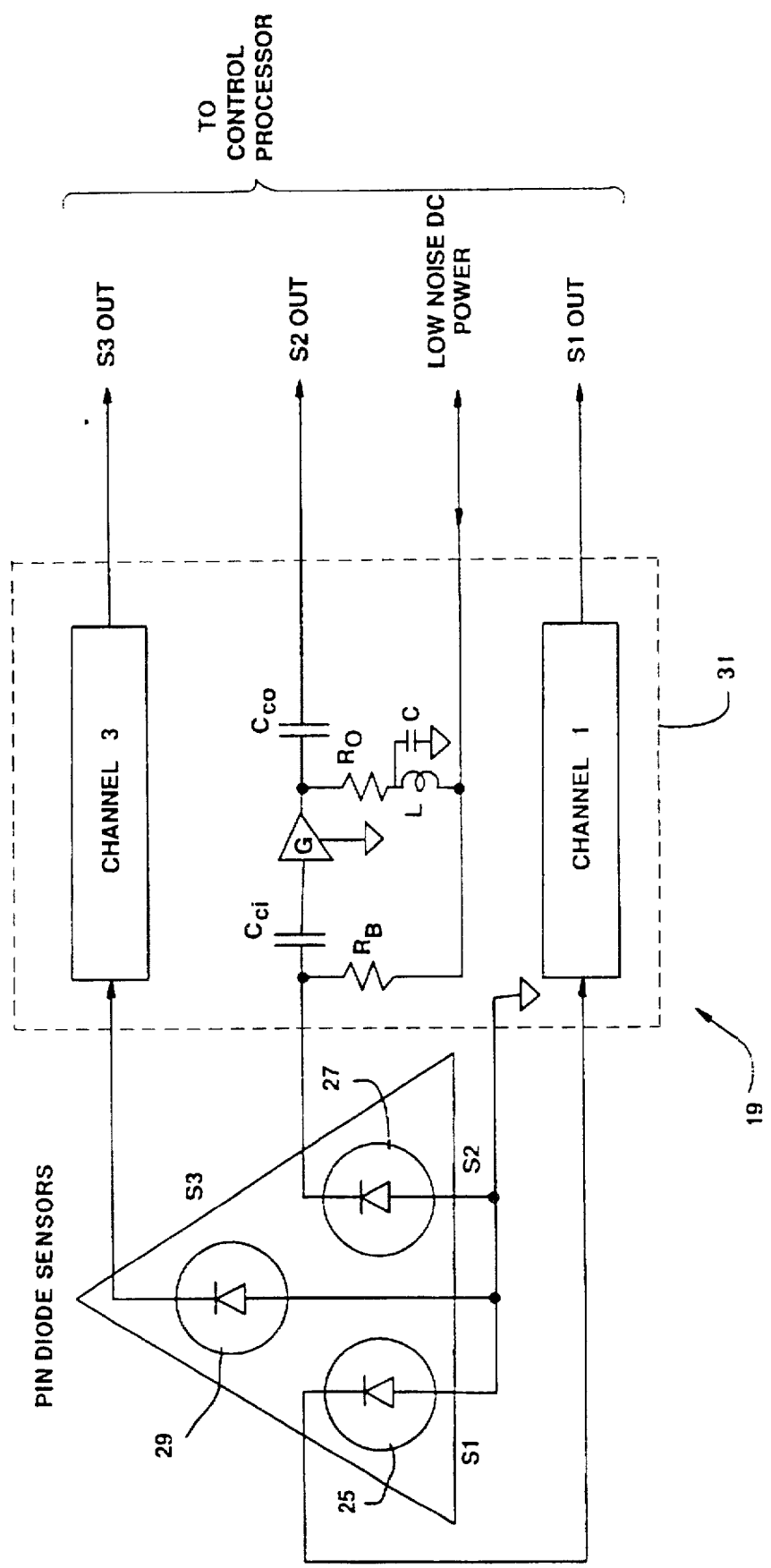
FIG. 3 shows a schematic diagram of the elements of the receiver sensor assembly thereof.

FIG. 3 shows, schematically, a block diagram of the receiver sensor assembly. The receiver sensor consists of three PIN photodiodes 25, 27 and 29 arranged in a triangular pattern, mounted on a circuit card assembly. The photodiodes are also denoted as S1, S2, and S3 in the diagram given in FIG. 3. The PIN diodes serve to sense the modulated infrared (IR) energy generated by the scanning transmitter 11. Each diode is connected in reverse-bias mode to a low noise amplifier 31. Each amplifier's output is connected through a cable to the control processor unit for further amplification and signal processing. Amplifier and PIN diode bias voltages are connected to the receiver through the same cable. These bias voltages are derived from a separate low noise DC supply located in the control processor circuitry.

The receiver sensor assembly utilizes three sensors arranged on the triangular-shaped plane in order for the system to obtain pitch, roll and azimuth (yaw) information. Each sensor, when scanned by the three beams generated by the scanning transmitter will output information which is processed by the control circuitry. The sensor signals allow determination of the x, y, and z coordinates for each sensor. This coordinate information permits determination of the object's orientation. This process is discussed in more detail hereinafter.

Figure 4:
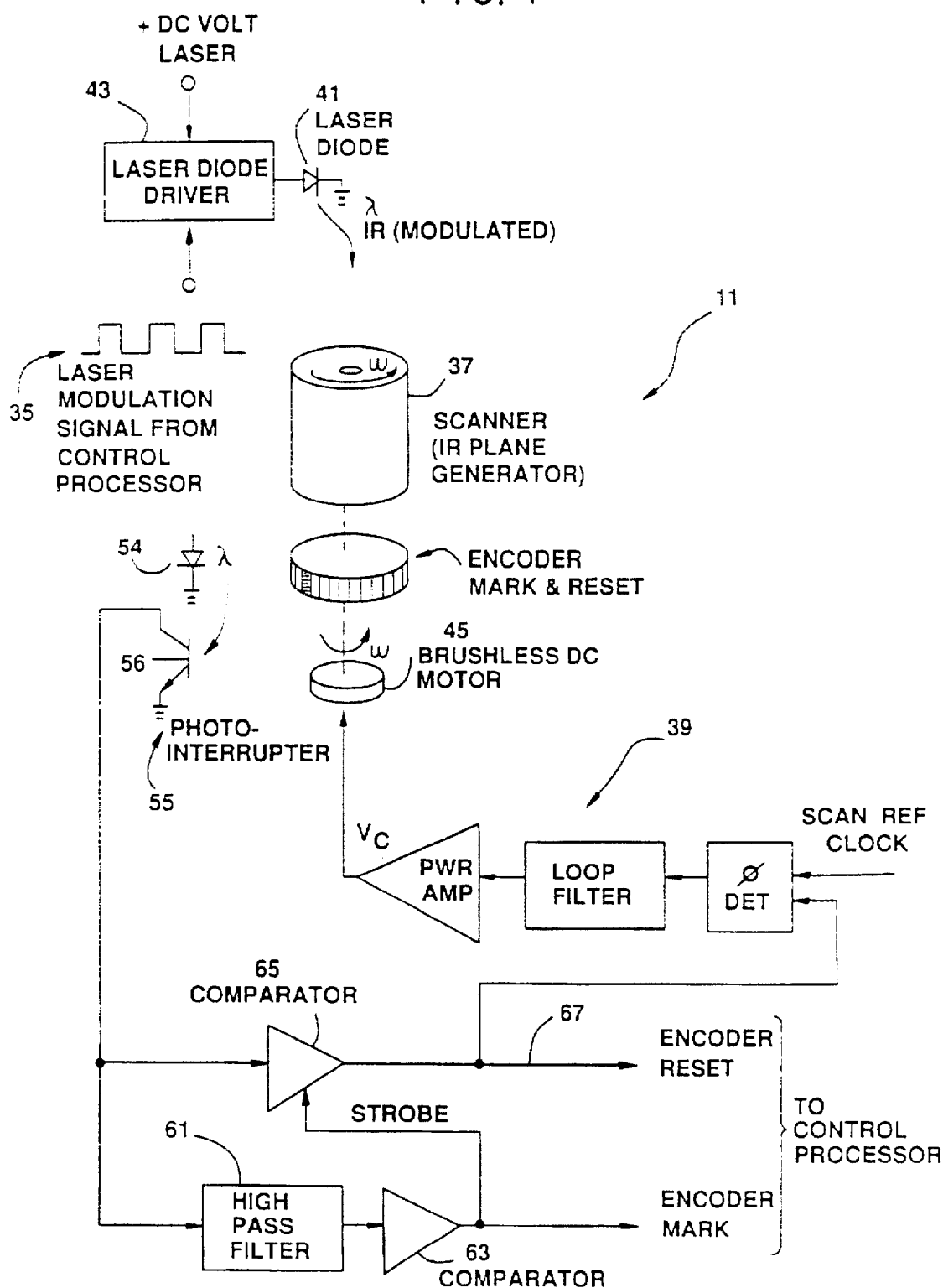
FIG. 4 shows the component parts of the scanning transmitter assembly thereof.

FIG. 4 shows, schematically, a block diagram of the scanning transmitter assembly 11. The principal elements of the scanning transmitter assembly 11 are the laser diode modulator 35, the optical scanner/motor driver circuit, and the encoder circuitry 39.

The source of light comprises a laser diode 41, preferably direct modulated at 9 MHz. Standard modulation techniques used by those familiar with the laser diode technology are employed in the laser diode driver 43.

The scanner cylinder 37 is attached to drive means including the rotor 47 of a brushless DC motor 45 which drives the scanner. As a part of the scanner, there is an encoder graticule 49 attached to the lower circumference of the cylinder. The encoder graticule 49 has line pairs 51 inscribed at 500 line pairs per inch, as well as a single, larger opaque non-reflective "tick mark" 53 which generates the encoder reset pulse which occurs at once per scanner revolution (90 Hz).

It should be noted that the 90 Hz is a nominal scan rate, selected for the preferred embodiment, in order to obtain a specific data update rate. Any scan rate will permit the same calculations to be made, and will only affect the data update rate of the object's (x, y, z) coordinates.

The speed of motor 45 is governed by motor control means which maintains the rotational speed at 90 Hz; no precise control is required. A photo-interrupter circuit 55 senses the tick marks 51 on the encoder graticule as well as the reset pulse generating encoder mark 53 and reset pulses. The reset pulse comprises speed controlling signals. The reference clock frequency is generated by the programmable logic device (PLD) in the electronics unit and is set at the nominal 90 Hz.

The encoder graticule markings 51, 53 as well as the scanner reset pulse (the "tick mark") are detected by means of a light emitting diode (LED) 54 and phototransistor 56 configured as a standard photo-interrupter 55. The phototransistor 56 receives the LED energy during those portions of the scanner revolution when the optical energy is striking the reflective portion of the encoder surface, causing the phototransistor to turn "ON" or conduct. During other portions of the scanner rotation, when the LED 54 is radiating against either an encoder line or the larger "tick mark", no energy is reflected to the phototransistor causing the device to be in the "OFF" or non-conducting state. The phototransistor's output is connected to an operational amplifier 59 gain stage. The operational amplifier produces an amplified voltage signal proportional to the phototransistor's collector current. The amplified phototransistor output is then filtered and converted to a logic compatible signal with a voltage comparator.

Since a single photo-interrupter 55 is used to sense both the reset ("tick") mark and the encoder timing grating, it is first necessary to filter the photo-interrupter signal to separate the encoder mark and reset signals. The encoder mark signal is derived from the photo-interrupter output by employing a second order high pass filter 61 to remove the low frequency reset pulse. The filtered signal is then applied to a high speed voltage comparator 63 which generates a TTL logic compatible encoder mark signal comprising an indicator signal indicative of rotative position of the motor drive shaft. The raw photo-interrupter signal is also applied to a voltage comparator 65. The encoder mark signal and the raw signal outputs are logically combined using the comparator's latch function to form the reset signal which is sent through conductor 67.

Figure 5:
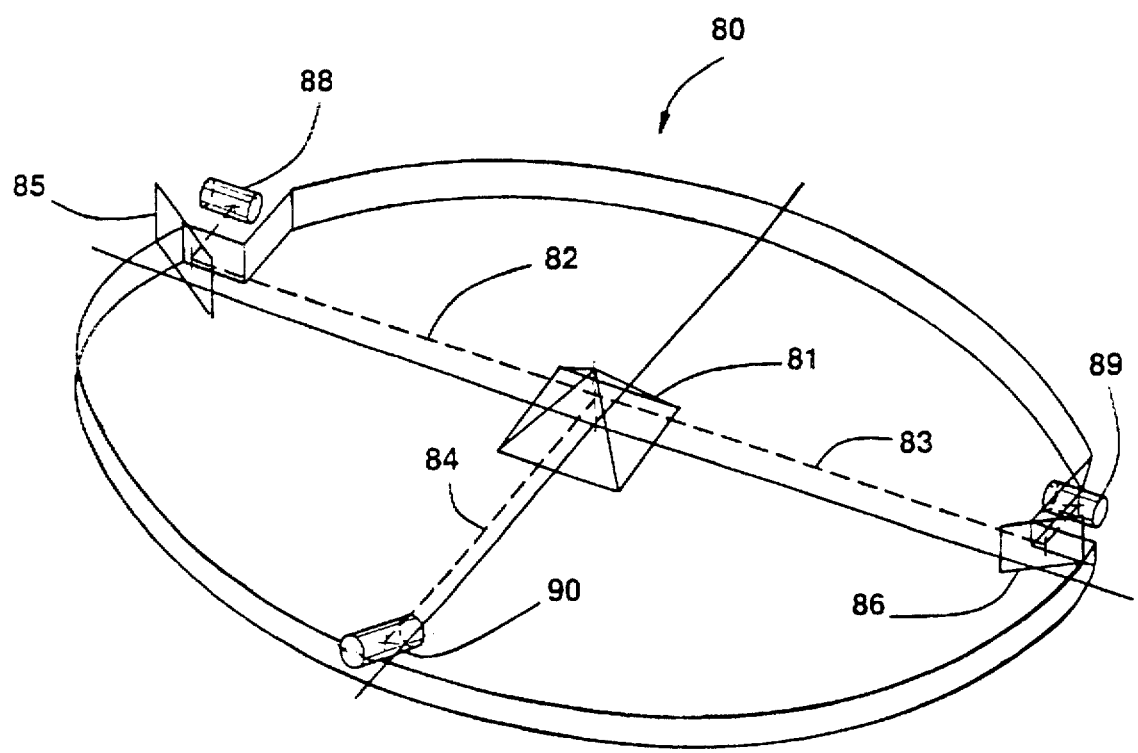
FIG. 5 shows a diagram of the preferred optical assembly of the scanner thereof, depicting the pyramid beam splitter, two mirrors and three thin glass rod lenses designed to split the incoming IR energy generated by the laser diode to form the three fan-shaped IR beams.

Referring to FIG. 5, there is shown an optical assembly 80, of the scanner. It is designed to split the incoming modulated infrared (IR) energy generated by the laser diode 41 to form the three IR planes which are generated at a nominal 90 Hz rate. In the optical assembly 80, the light source comes in from the top and is split into three at the pyramid-shaped beam splitter 81 in the middle. The light then travels in three beams 82, 83 and 84. Beams 82 and 83 reach one of the two mirrors 85 and 86 and illuminate the thin rod lenses 88 and 89 to form the two parallel fan-shaped beams. Beam 84 illuminates the thin rod lens 90 directly to form the skewed fan-shaped beam. The three fan-shaped beams get transmitted out toward the receiver assembly, when the optical assembly is rotated. This arrangement allows all the beam generating mirrors and rods to be in the same plane.

The modulated IR planes are generated at a 90 Hz rate by the transmitter assembly, part of which includes an optical scanner generating planes with the following position and orientation. The first plane is parallel to the rotational axis and offset from the axis by a distance of R, the scanner rotor radius. The second plane is parallel to the first plane, but with a negative offset of R. Finally, the third rotating plane is generated with a skew orientation of $\beta$ with respect to the rotational axis.

Figure 6:
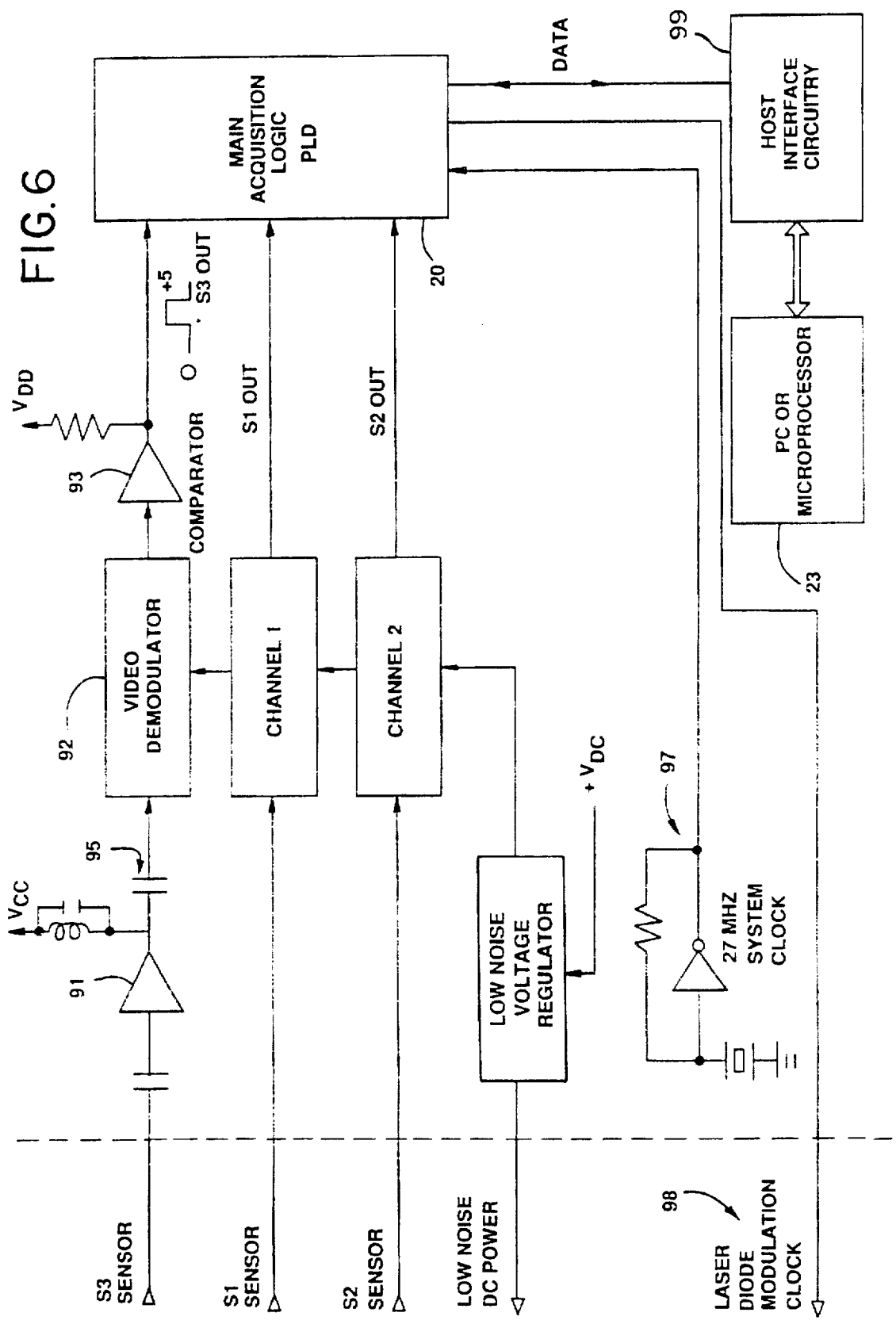
FIG. 6 shows a schematic block diagram of the control processor thereof.

FIG. 6 shows, schematically, a block diagram of the control processor. The control processor 20 includes the balance of the receiver signal processing as well as logic interface circuitry and voltage regulation for the three axis measurement system.

The receiver processing circuitry is comprised of three cascaded stages; a high gain bandpass amplifier 91, video demodulator 92, and a high speed voltage comparator 93. In addition to the processing stages, the receiver circuitry contains a low noise DC bias circuit.

The video demodulator 92 rectifies the video/RF burst envelope created by the modulated laser beam crossing the PIN diode detector. The output waveform of the demodulator 92 represents the positive part of the RF envelope. The demodulated signal is then fed through a first order low pass filter which removes the residual 9 MHz modulation signal.

The final stage of the receiver processing circuitry is a high speed voltage comparator 93 which generates a logic compatible signal whose rising and falling edges coincide with the rising and falling edges of the video/RF envelope. The rising and falling logic transitions are used to determine the precise time that the laser beam crosses the center of the PIN diode detector, thus allowing the three axis measurement system to meet its positional and angular accuracy requirements. The control processor 20 includes signal processing means for determining the exact beam intersection point by means of timing circuitry which determines the center time between rising and falling edges of the comparator output. The use of "center processing" circuitry removes the signal amplitude variable from affecting the accuracy of the, time and hence position determination.

Figure 7:
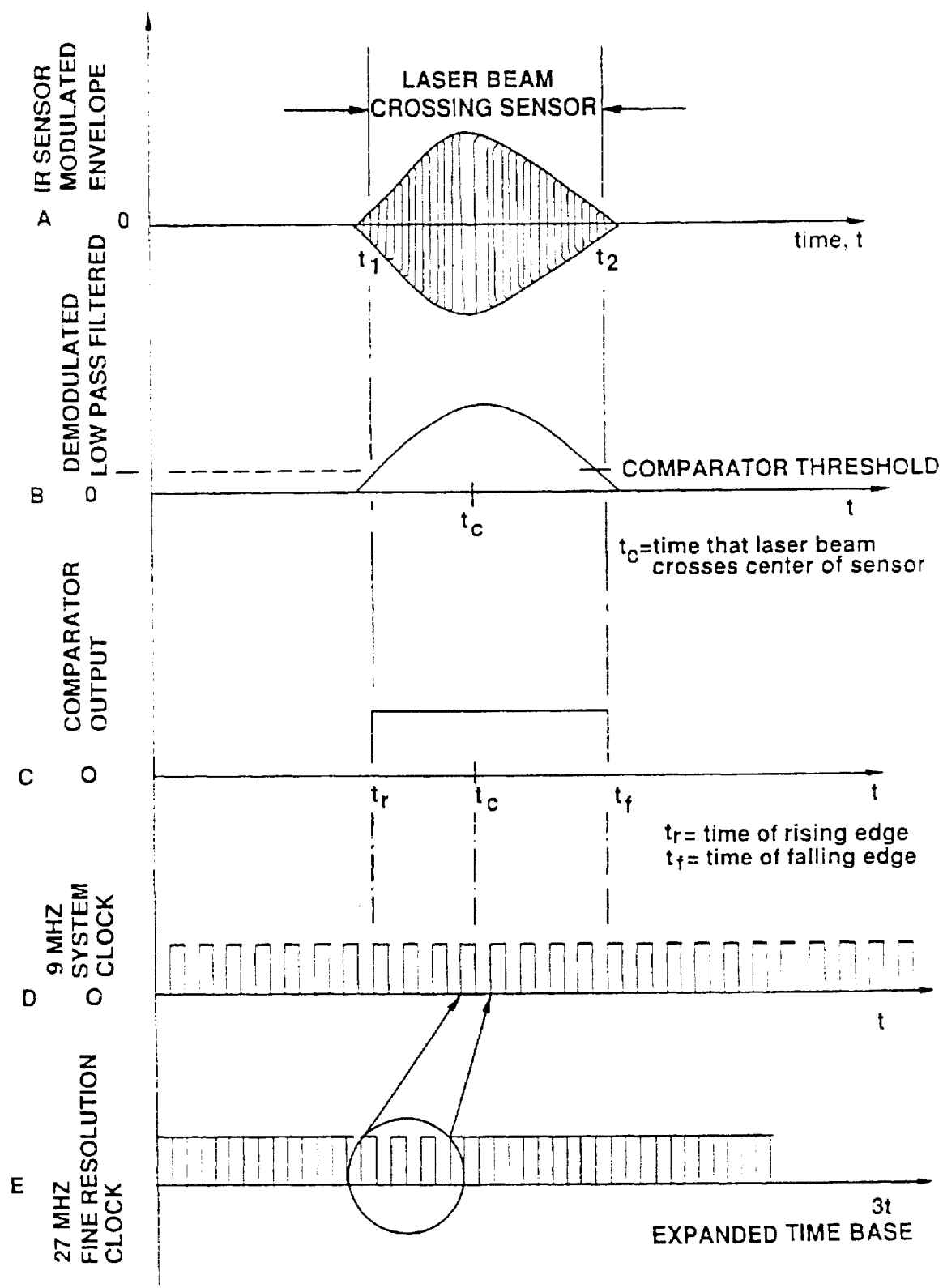
FIG. 7 shows a timing diagram thereof depicting the modulated optical signal seen at the output of the PIN diode sensor assembly, the demodulated, low-pass filtered signal, comparator output and the timing measurements used to determine the precise point that the modulated optical beam intercepts the center of a particular optical sensor.

Reference will now be made to FIG. 7 which depicts a signal processing flow and timing diagram of the PIN diode sensor data. The first waveform A, shown at the top of the figure, represents the modulated sensor output as would be present at the output of the sensor amplifier. The waveform is at zero volts until time t1, which represents the instant in time that a fan-shaped beam first impinges on a sensor. The sensor output rises in amplitude as the beam approaches the center of the sensor, then decreases to zero volts at time t2, when the beam falls off the PIN diode sensor.

The second waveform B depicts the demodulated and low-pass filtered waveform that is applied to a comparator to generate a logic compatible signal. Low pass filtering is employed to remove vestigial traces of the 9 MHz modulation frequency. The dashed line, parallel to and above the time axis t, indicates the comparator's threshold voltage. Time tc, indicates the center of the low pass filtered waveform, coincident with the peak amplitude of the signal.

The third waveform C is the comparator output, obtained from the low pass filtered waveform. Times tr and tf represent the comparator "trip" points from the rising and falling edges respectively, of the low pass filtered signal.

Figure 8:
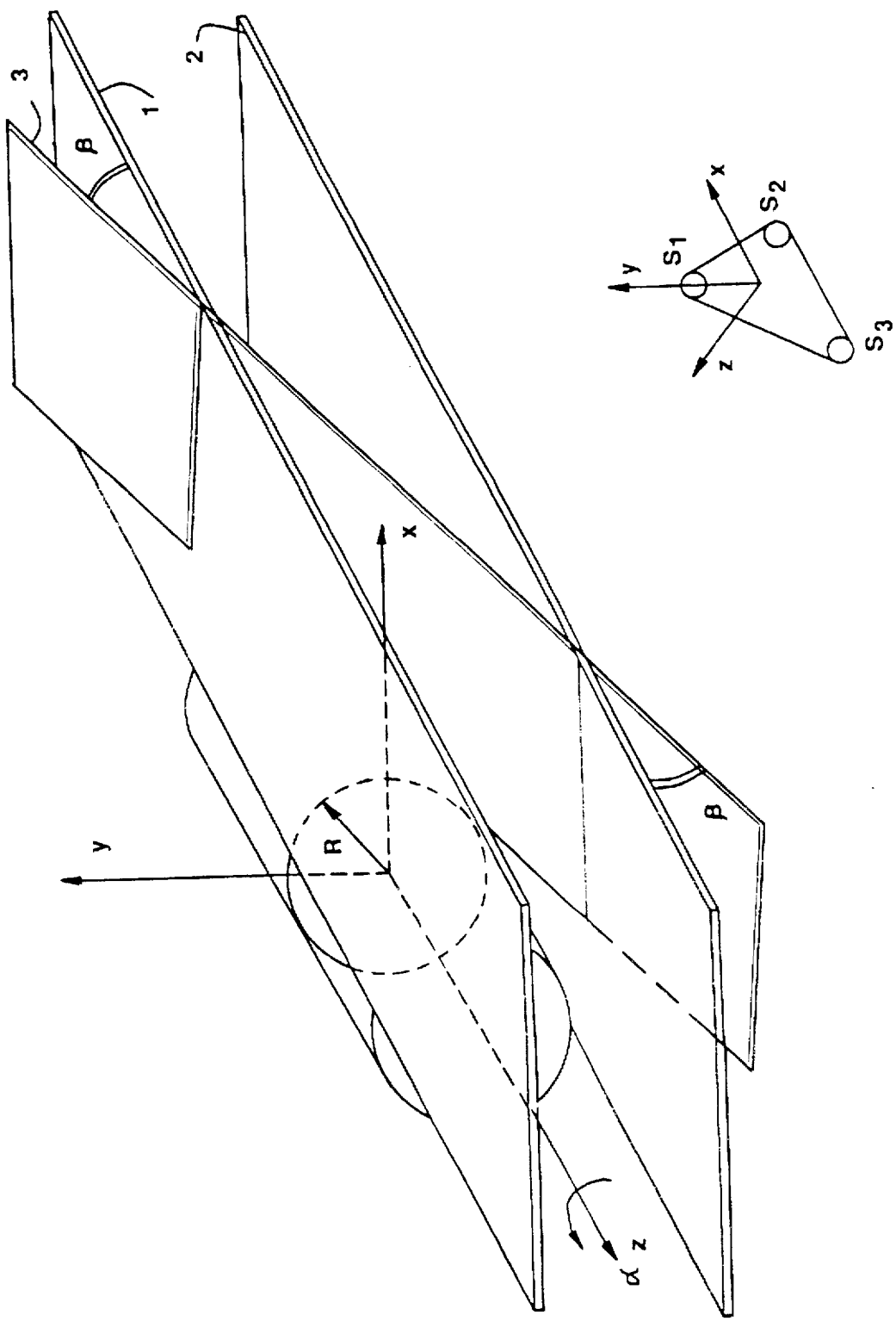
FIG. 8 shows the geometry of the system of FIG. 1 with the scanner and its three optical beam patterns, and the receiver assembly with its three sensors.

The last two waveforms D and E depicted in FIG. 8 are the 9 MHz and 27 MHz system clocks, respectively, used to determine the exact center of the laser beam crossing the sensor diode. Determination of the precise center point permits an exact calculation of the crossing time and hence an accurate calculation of the angle that the optical beam formed with any particular diode sensor.

The processing of the signal center calculation is performed by counting clock cycles between the rising edge of the comparator output (tr) and the falling edge of the comparator output (tf). In the particular signal shown in FIG. 8, there are four 9 MHz clocks between tr and tc. In instances where there are non-integer 9 MHz clock cycles between tr and tc, the 27 MHz clock is used to allow finer determination of time tc. The 9 MHz clock facilitates "coarse" time determination, whereas the 27 MHz clock facilitates "fine" time determination.

It is significant to note that the system is designed to be insensitive to pulse amplitude variation, which would normally cause potential errors in timing accuracy. The insensitivity to pulse amplitude is achieved by always measuring tr and tf, then determining tc as the time between tr and tf. Since tr and tf will vary as the pulse amplitude, as well as rise and fall time of the modulated waveform, it is crucial to remove this dependency from timing calculations.

FIG. 8 shows the geometry of the system. It depicts in schematic form a three beam system rotating about a common point of origin at a particular point in the scanner rotation.

The cylinder shown in FIG. 8 represents the scanner "drum" or rotor 13 which contains the optical assembly 80, which is illuminated by the modulated laser diode, thus creating the three fan-shaped beams 1, 2 and 3 which rotate about a common point.

The receiver assembly is shown here consisting of three sensors, S1, S2 and S3, arranged in a triangular arrangement.

There are 3 light planes 1, 2 and 3 "fixed" to the motor shaft of radius R.

Planes 1 and 2 are parallel to one another and tangent to the shaft. The distance or spacing between the planes is 2*R.

Plane 3 crosses planes 1 and 2. The cross angle is $\beta$. Plane 3 can be depicted if one would place a plane parallel to the planes 1 and 2 right in the middle between planes 1 and 2 and then twist that plane by the angle $\beta$.

The reference frame is defined in the following way:

z-axis is the axis of the shaft x-axis is a horizontal axis y-axis is a vertical axis.

Angle $\alpha$ is defined as an angle of rotation about z-axis.

During the operation, the shaft turns around and light planes 1, 2 and 3 pass the sensors S1, S2 and S3.

Nine values of angle $\alpha$ are measured and used to compute the receiver's position and orientation:

$\alpha_{11}$—plane 1 crosses S1

$\alpha_{12}$—plane 1 crosses S2

$\alpha_{13}$—plane 1 crosses S3

$\alpha_{21}$—plane 2 crosses S1

$\alpha_{22}$—plane 2 crosses S2

$\alpha_{23}$—plane 2 crosses S3

$\alpha_{31}$—plane 3 crosses S1

$\alpha_{32}$—plane 3 crosses S2

$\alpha_{33}$—plane 3 crosses S3.

Figure 9A:
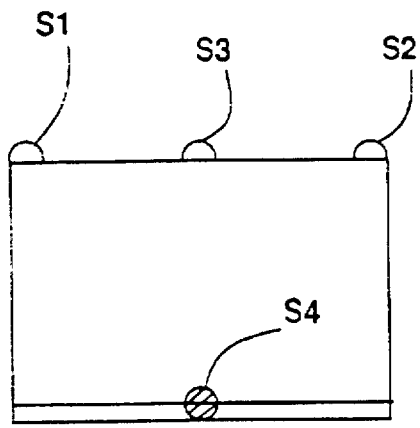
FIGS. 9A, 9B, 9C, and 9D show front, top, rear, and perspective views, respectively, of an alternative receiver assembly with six sensors.
Figure 9B:
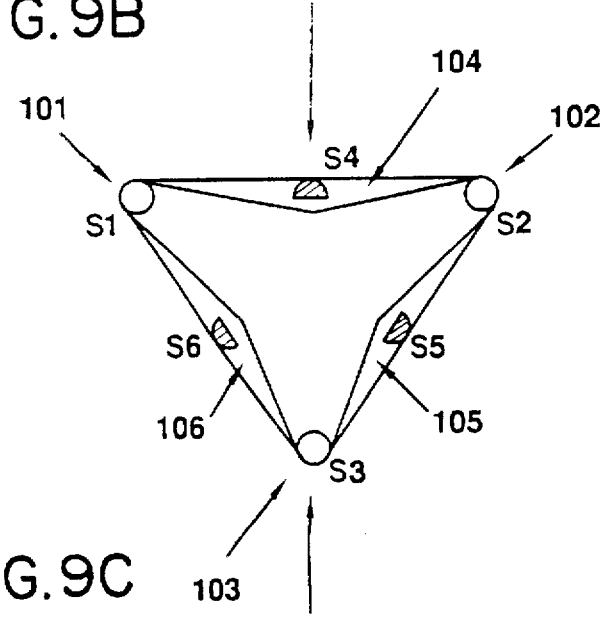
Figure 9C:
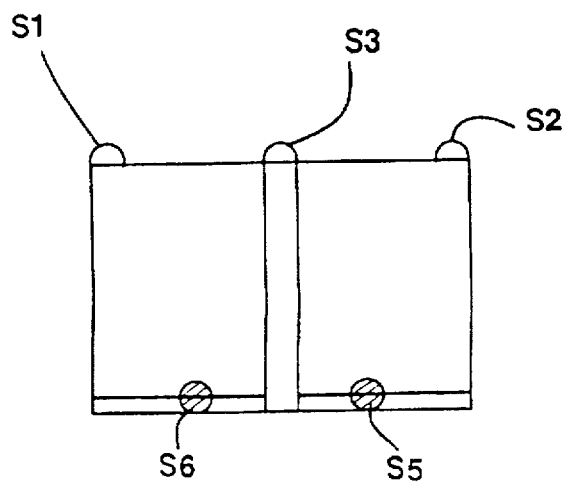
Figure 9D:
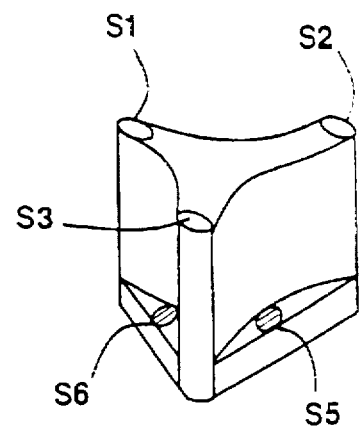

FIGS. 9A, 9B, 9C and 9D show, respectively, front, top, rear and perspective views of a receiver assembly with six sensors S1, S2, S3, S4, S5 and S6 arranged in a three-dimensional arrangement in accordance with the teachings of the present invention. As shown, the receiver assembly 100 is generally triangular from above having three apices 101, 102 and 103 that respectively receive the sensors S1, S2 and S3. Additionally, as best seen in FIG. 9B, recesses 104, 105 and 106 are provided with the recess 104 lying between the apices 101 and 102, with the recess 105 lying between the apices 102 and 103, and with the recess 106 lying between the apices 103 and 101. As also best seen in FIG. 10B, the sensors S4, S5 and S6 lie within the recesses 104, 105 and 106, respectively.

The arrangement of the sensors shown in FIGS. 9A–D is made so that the receiver assembly always has at least three sensors in clear line-of-sight to the scanning transmitter to best facilitate achievement of highest resolution for orientation determination at any orientation angle.

Determination of position for each sensor S1, S2, S3 based on angle $\alpha$ measurements.

The same math is used to compute x,y,z coordinates of all three sensors. The details are explained here for the sensor S1. x and y coordinate computation is irrelevant to the coordinate z and can be done based upon measurements of the planes 1 and 2 only, which are angles $\alpha_{11}$ and $\alpha_{21}$.

Figure 10:
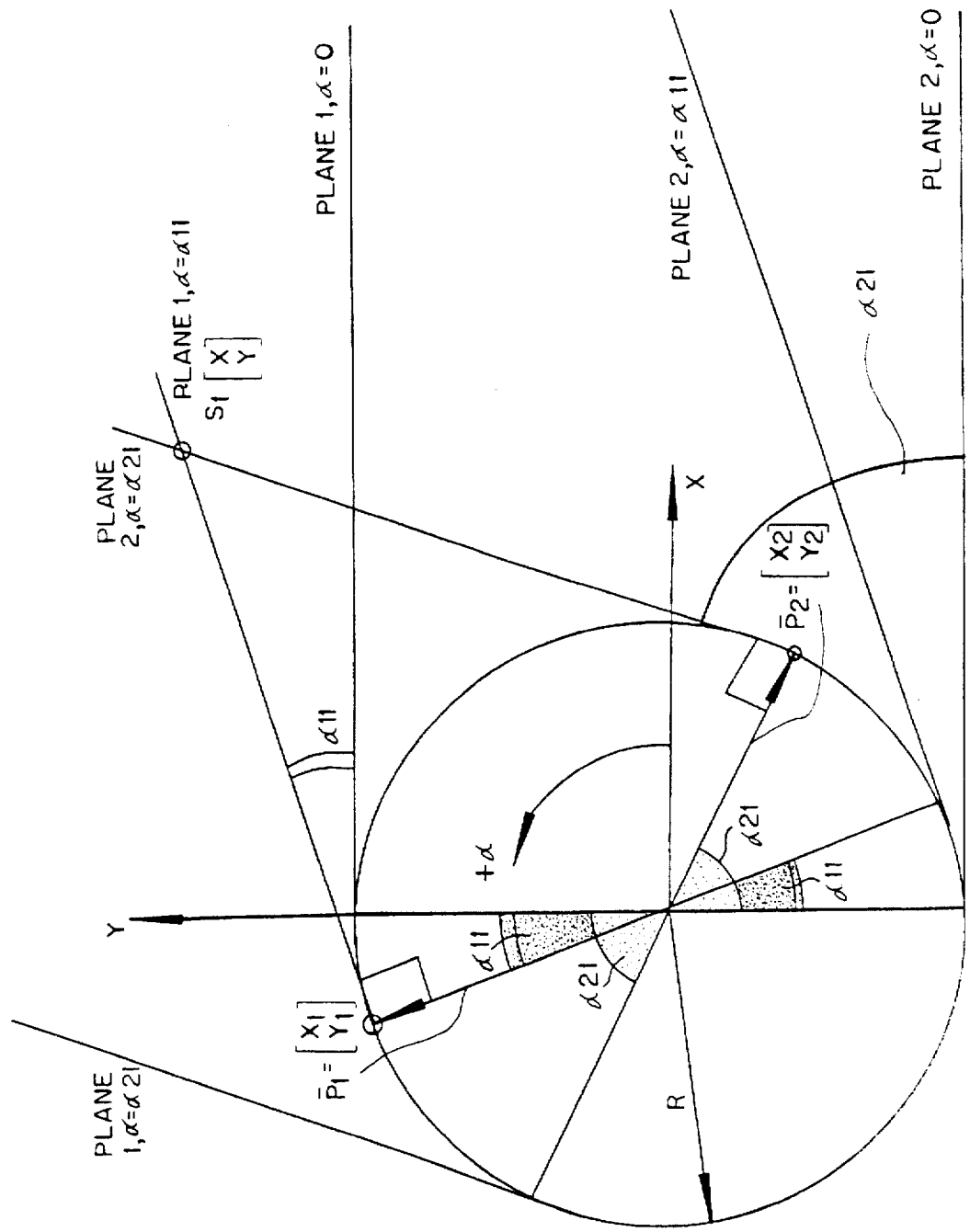
FIG. 10 shows the geometry for determination of the spatial coordinates (x,y).

The geometry used in the x,y coordinate computation is shown in FIG. 10.

Let's introduce points P1 and P2. Those points comprise the respective projections of the tangent lines of light planes 1 and 2 on the XY plane.

x,y coordinates of the point P1 at the instant, when the plane 1 passes through the sensor S1 are:

$$\overline{P}_1 = \begin{bmatrix} x_1 \\ y_1 \end{bmatrix} = R * \begin{bmatrix} \cos(90 + \alpha_{11}) \\ \sin(90 + \alpha_{11}) \end{bmatrix} = R * \begin{bmatrix} -\sin\alpha_{11} \\ \cos\alpha_{11} \end{bmatrix} \quad (1)$$

x,y coordinates of the point P2 at the instant, when the plane 2 passes through the sensor S1 are:

$$\vec{P}_2 = \begin{bmatrix} x_2 \\ y_2 \end{bmatrix} = R * \begin{bmatrix} \cos(-90 + \alpha_{21}) \\ \sin(-90 + \alpha_{21}) \end{bmatrix} = R * \begin{bmatrix} \sin\alpha_{21} \\ -\cos\alpha_{21} \end{bmatrix} \quad (2)$$

Solving these equations using standard methods results in $$\begin{bmatrix} x \\ y \end{bmatrix} = \frac{R}{\sin(\alpha_{21} - \alpha_{11})} * \begin{bmatrix} \cos\alpha_{11} \cos\alpha_{11} \\ \sin\alpha_{21} \sin\alpha_{11} \end{bmatrix} \quad (3)$$

Now the z coordinate can be computed from computed x and y coordinates and measured angle $\alpha_{31}$.

Figure 11:
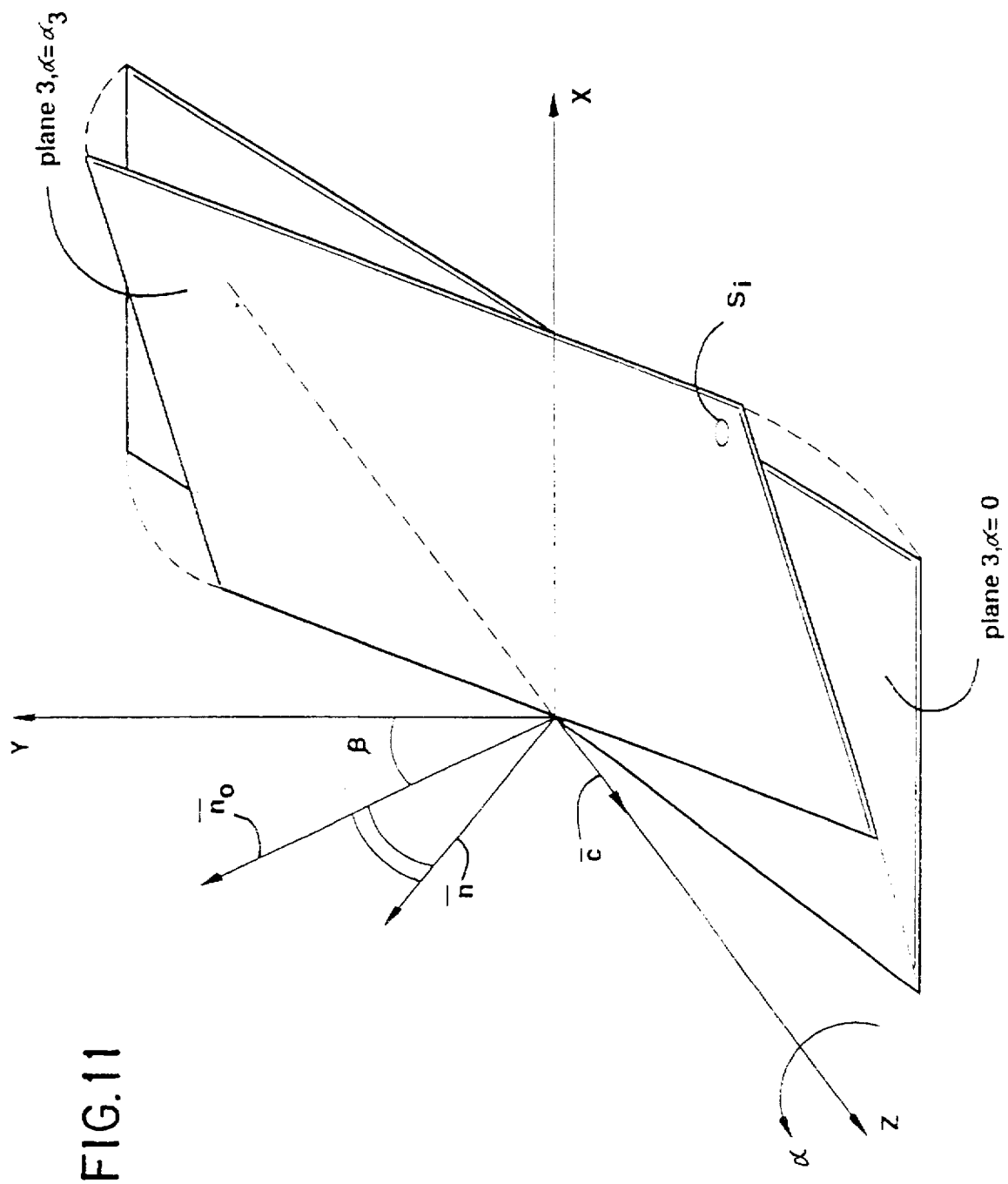
FIG. 11 shows the geometry for determination of the z coordinate with the skew plane generated by the three axis system.

FIG. 11 shows the geometry that is used to compute the z coordinate. Because the plane 3 passes the origin of the reference frame, using the normal Hessian form results in $$n_1*x + n_2*y + n_3*z = 0 \quad (4)$$

where $$\vec{n} = \begin{bmatrix} n_1 \\ n_2 \\ n_3 \end{bmatrix} = \begin{bmatrix} -\sin\alpha_{31}*\cos\beta \\ \cos\alpha_{31}*\cos\beta \\ \sin\beta \end{bmatrix}$$

is a unit vector normal to the plane 3 at the instant, when the plane passes the sensor S1 x, y—known coordinates of S1
z—unknown coordinate of S1.

Using standard methods z can be found to be $$x = -\frac{1}{\sin\beta} *(-r*\sin\alpha_{31}*\cos\beta + y*\cos\alpha_{31}*\cos\beta) =$$

$$\cot\beta*(r*\sin\alpha_{31} + y*\cos\alpha_{31})$$

After coordinates of all sensors S1, S2 and S3 are computed, the receivers position can be determined. The formula to compute position depends upon how the sensors are defined in the receiver frame. For the case shown in FIG. 8, where sensors are in the vertices of an equilateral triangle, in the plane XY of the receiver frame, and with the origin in a center of the triangle, the formula to compute the receiver's position is:

$$\begin{bmatrix} X \\ Y \\ Z \end{bmatrix} = \frac{\vec{S1} + \vec{S2} + \vec{S3}}{3}$$

Determination of Orientation Angles

Figure 12:
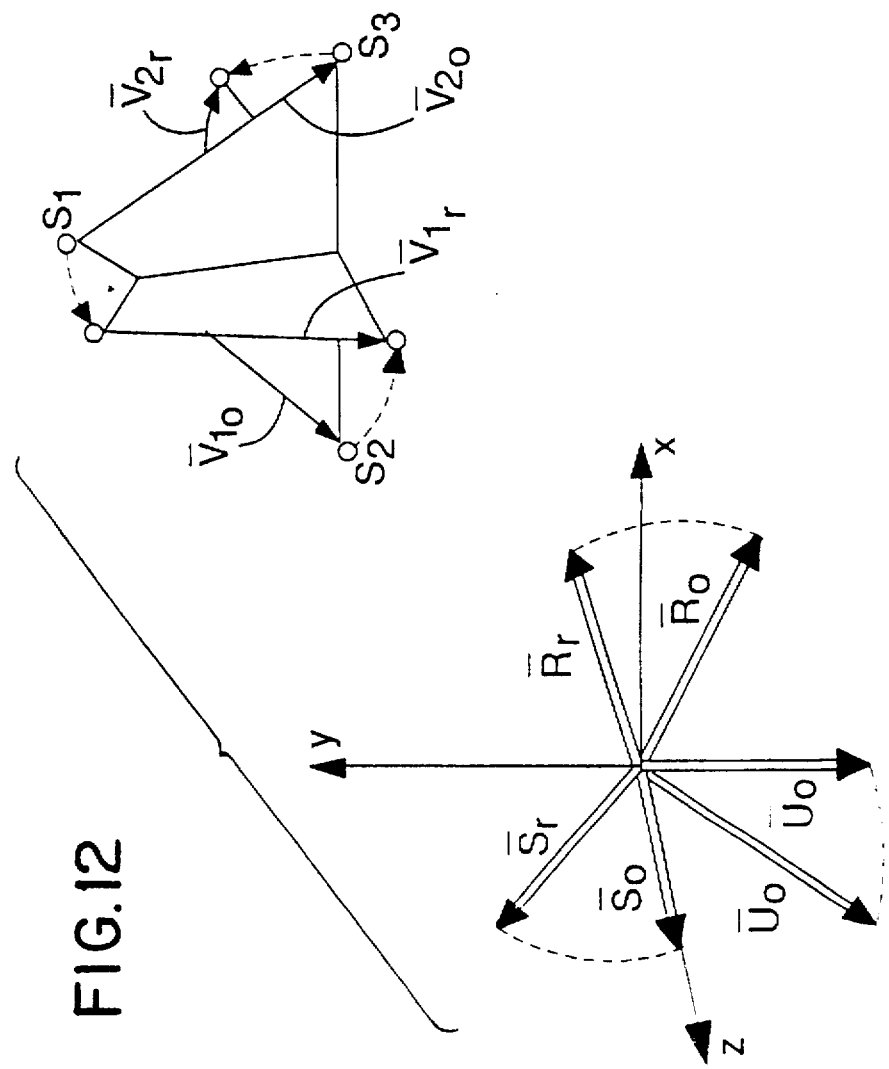
FIG. 12 shows the geometry for determination of receiver orientation.

Reference will now be made to FIG. 12, which depicts the receiver sensor assembly located at some arbitrary point in space. The sensor assembly is scanned by the scanning transmitter as was previously discussed for the single object 0. The three sensors are denoted by reference designations S1, S2 and S3 and have spatial coordinates: (x1, y1, z1), (x2, y2, z2), and (x3, y3, z3). These coordinates as well as pitch, roll and yaw definitions for the sensor plane are defined in FIG. 1.

The system determines the positional information of each sensor following the mathematical techniques just discussed. Pitch, roll and azimuth information, which comprises the orientation of the sensor assembly is determined through knowledge of the fact that the sensors are situated on a flat plane, as well as knowledge of the position of each sensor with respect to all other sensors.

By way of example, if sensors S1, S2, and S3 all have the same x coordinate, then it can be determined that the sensor plane is parallel to the Y-Z plane and therefore has a zero pitch orientation. In similar fashion, roll and azimuth orientation can be determined.

Determination of the orientation of the receiver based oil the computed coordinates of the sensors S1, S2, S3.

FIG. 11 illustrates the preferred Receiver orientation computation algorithm.

As shown in FIG. 12, vectors $\overline{V_1}$ and $\overline{V_2}$ extend from the sensor S1 in the directions of sensors S2 and S3, respectively.

When the receiver frame is aligned with the reference frame, vectors are $\overline{V_1} = \overline{V_{10}}$ and $\overline{V_2} = \overline{V_{20}}$.

When the receiver frame is rotated, vectors are $$\overline{V_1} = \overline{V_{1r}} \text{ and } \overline{V_2} = \overline{V_{2r}}.$$

The rotation matrix can be determined by using the formula:

$$\mathring{A} = [\overline{U_r}|\overline{S_r}|\overline{R_r}]*[\overline{U_0}|\overline{S_0}|\overline{R_0}]^{-1},$$

where $$\overline{U_0} = \overline{V_{10}}, \ \overline{S_0} = \overline{V_{13}} \times \overline{V_{23}}, \ \overline{R_0} = \overline{U_0} \times \overline{S_0}$$

and $$\overline{U_r} = \overline{V_{1r}}, \ \overline{S_r} = \overline{V_{1r}} \times \overline{V_{2r}}, \ \overline{R_r} = \overline{U_r} \times \overline{S_r}$$

Accordingly, an invention has been disclosed in terms of preferred embodiments thereof which fulfill each and every one of the objects of the present invention as set forth hereinabove and provides a new and useful optical 6D measurement system with three fan-shaped beams rotating around one axis of great novelty and utility. of course, various changes, modifications and alterations in the teachings of the present invention may be contemplated by those skilled in the art without departing from the intended spirit and scope thereof.

As such, it is intended that the present invention only be limited by the terms of the appended claims.

I claim:

1. A system for determining position and orientation of an object, comprising:
   a) transmitter means for emitting three beams of light including a first beam, a second beam skewed with respect to said first beam, and a third beam;
   b) drive means for rotating said transmitter means whereby said beams rotate as well;
   c) a receiver attachable to an object within a space, said receiver carrying at least three sensors spaced in a prescribed configuration;
   d) connection means for connecting said sensors to computer means whereby signals are conveyed to said computer means from said sensors indicative of each moment at which each respective beam intersects each respective sensor;
   e) said computer means being programmed for calculating, from said signals, position and orientation of said receiver including x, y and z coordinates as well as pitch, roll and yaw.

2. The system of claim 1, wherein said third beam is parallel to said first beam.

3. The system of claim 1, wherein said transmitter means includes a source of light and a beam splitter aligned with said source of light and adapted to split light from said source of light into said first, second and third beams.

4. The system of claim 3, wherein said source of light comprises a modulated LASER diode and said light comprises a LASER beam.

5. The system of claim 3, wherein said beam splitter includes a separate reflective mirror for the first and the third beam, each mirror reflecting light from said source of light to form a respective beam of light.

6. The system of claim 3, wherein said beam splitter includes a thin rod lens for each beam creating three fan-shaped beams.

7. The system of claim 4, wherein said light comprise short wave infrared light.

8. The system of claim 1, wherein said drive means includes a motor.

9. The system of claim 8, wherein said motor comprises a brushless DC motor controlled by a phase-locked loop servo.

10. The system of claim 8, wherein said motor is speed controlled by motor control means.

11. The system of claim 10, wherein said motor control means provides speed controlling signals to said motor and indicator signals to said computer means indicative of rotative position of said transmitter means.

12. The system of claim 11, wherein said transmitter means comprises a scanner.

13. The system of claim 1, wherein said computer means includes signal processing means for processing said signals, said signal processing means measuring a rising edge tr and falling edge tf of each signal and, therefrom, calculating a center time tc of each signal representative of a time when a respective beam has crossed a center point of a respective sensor.

14. The system of claim 3, said transmitter means further including a separate rod for each beam, each rod being illuminated by light from said source of light to form each fan-shaped beam.

15. The system of claim 1, said receiver including six sensors spaced in a prescribed non-coplanar configuration.

16. The system of claim 1, wherein each beam is fan-shaped.

17. A method for determining position and orientation of an object in six degrees of freedom, including the steps of:
 a) attaching a receiver on an object, said receiver having three sensors spaced in a prescribed configuration;
 b) providing a transmitter for transmitting first, second and third beams, said first and second beams being skewed with respect to one another;
 c) rotating said transmitter whereby respective said beams periodically intersect respective said sensors;
 d) measuring each time a respective beam intersects a respective sensor;
 e) calculating position and orientation of said object.

18. The method of claim 17, said rotating step further including the steps of providing a motor and controlling rotation of said motor, said controlling step further including the step of providing indicator signals, to computer means, indicative of rotative position of a shaft of said motor.

19. The method of claim 18, further including the step of providing intersection signals to said computer means indicative of when each beam intersects a respective sensor.

20. The method of claim 21, said calculating step including said steps of providing indicator signals and intersection signals.

21. A system for determining position and orientation of an object, comprising:
 a) transmitter means for emitting at least three beams of light including a first beam, a second beam skewed with respect to said first beam, and a third beam, said beams emanating from a single light source conveyed through a beam splitter;
 b) drive means for rotating said transmitter means whereby said beams rotate as well, said drive means comprising a motor having a rotary drive shaft defining a common axis from which said beams emanate;
 c) a receiver attachable to an object within a space, said receiver carrying three sensors spaced in a prescribed configuration;
 d) connection means for connecting said sensors to computer means whereby signals are conveyed to said computer means from said sensors indicative of each moment at which each respective beam intersects each respective sensor;
 e) said computer means being programmed for calculating, from said signals position and orientation of said receiver including x, y and z coordinates as well as pitch, roll and yaw.

* * * * *